United States Patent
de Vicente Peña et al.

(10) Patent No.: US 12,431,114 B2
(45) Date of Patent: Sep. 30, 2025

(54) DELAY ESTIMATION FOR PERFORMING ECHO CANCELLATION FOR CO-LOCATED DEVICES

(71) Applicant: Google LLC, Mountain View, CA (US)

(72) Inventors: Jesús de Vicente Peña, Stockholm (SE); Mans Gustaf Sebastian Ullberg, Stockholm (SE); Lionel Koenig Gélas, Stockholm Iän (SE)

(73) Assignee: GOOGLE LLC, Mountain View, CA (US)

( * ) Notice: Subject to any disclaimer, the term of this patent is extended or adjusted under 35 U.S.C. 154(b) by 232 days.

(21) Appl. No.: 18/297,218

(22) Filed: Apr. 7, 2023

(65) Prior Publication Data
US 2024/0339100 A1  Oct. 10, 2024

(51) Int. Cl.
*G10K 11/178* (2006.01)

(52) U.S. Cl.
CPC .. *G10K 11/17825* (2018.01); *G10K 11/17875* (2018.01); *G10K 2210/108* (2013.01); *G10K 2210/30231* (2013.01); *G10K 2210/3026* (2013.01); *G10K 2210/3028* (2013.01); *G10K 2210/3047* (2013.01); *G10K 2210/505* (2013.01)

(58) Field of Classification Search
CPC .. H04M 9/08; H04M 9/082; G10K 11/17825; G10K 11/17875; G10K 2210/108; G10K 2210/30231; G10K 2210/3026; G10K 2210/3028; G10K 2210/3047; G10K 2210/505
See application file for complete search history.

(56) References Cited

U.S. PATENT DOCUMENTS

| | | | |
|---|---|---|---|
| 9,916,840 B1 | 3/2018 | Do et al. | |
| 10,297,266 B1* | 5/2019 | Burenius | H04R 1/406 |
| 11,098,690 B2 | 8/2021 | Roland | |
| 11,418,655 B2 | 8/2022 | Loiko et al. | |
| 2016/0050491 A1* | 2/2016 | Ahgren | H04B 3/23 381/66 |
| 2016/0143673 A1 | 5/2016 | McClintock | |
| 2019/0349471 A1* | 11/2019 | Ferguson | H04M 3/568 |

OTHER PUBLICATIONS

International Search Report and Written Opinion for Application No. PCT/US2023/078237, mailed Feb. 7, 2024, 10 pages.

* cited by examiner

*Primary Examiner* — Jason R Kurr
(74) *Attorney, Agent, or Firm* — DORITY & MANNING P.A.

(57) ABSTRACT

An audio transmission is received by a participant computing device. The participant computing device is one of a plurality of participant computing devices of a participant cohort that are co-located. Matched filters are generated based on the transmission that are configured to predict at least a portion of audio caused by playback of the transmitted audio signal. Each of the matched filters includes coefficients. An audio signal is captured with an audio capture device. The captured audio signal corresponds to audio produced by playback of the transmitted audio signal with audio output devices of devices of the participant cohort. A matched filter is identified that most accurately predicts the audio signal. A delay estimate is generated based on a predictive contribution of one of the coefficients of the matched filter.

20 Claims, 6 Drawing Sheets

DELAY ESTIMATION FOR PERFORMING ECHO CANCELLATION FOR CO-LOCATED DEVICES

FIELD

The present disclosure relates generally to echo cancellation. More specifically, the present disclosure relates to delay estimation for performing echo cancellation for devices that are co-located (e.g., located in the same area).

BACKGROUND

Teleconferencing generally refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

SUMMARY

Aspects and advantages of embodiments of the present disclosure will be set forth in part in the following description, or can be learned from the description, or can be learned through practice of the embodiments.

One example aspect of the present disclosure is directed to computer-implemented method. The method includes receiving, by a participant computing device comprising one or more processors, an audio transmission comprising a transmitted audio signal for playback at an audio output device associated with the participant computing device, wherein the participant computing device is one of a plurality of participant computing devices of a participant cohort that are co-located within a same area. The method includes, based on the transmitted audio signal, generating, by the participant computing device, a plurality of matched filters that are configured to predict at least a portion of an audio signal corresponding to audio caused by playback of the transmitted audio signal, wherein each of the plurality of matched filters comprises a plurality of coefficients. The method includes capturing, by the participant computing device, audio data comprising a captured audio signal with an audio capture device associated with the participant computing device, wherein the captured audio signal corresponds to audio produced by playback of the transmitted audio signal with audio output devices of two or more participant computing devices of the participant cohort. The method includes identifying, by the participant computing device, a matched filter of the plurality of matched filters that most accurately predicts the at least the portion of the audio signal. The method includes generating, by the participant computing device, a delay estimate based on a predictive contribution of one or more of the plurality of coefficients of the matched filter.

Another example aspect of the present disclosure is directed to a participant computing device that includes one or more processors and one or more non-transitory computer-readable media that store instructions that, when executed by the one or more processors, cause the participant computing device to perform operations. The operations include receiving an audio transmission comprising a transmitted audio signal for playback at an audio output device associated with the participant computing device, wherein the participant computing device is one of a plurality of participant computing devices of a participant cohort that are co-located within a same area. The operations include, based on the transmitted audio signal, generating a plurality of matched filters that are configured to predict at least a portion of an audio signal corresponding to audio caused by playback of the transmitted audio signal, wherein each of the plurality of matched filters comprises a plurality of coefficients. The operations include capturing audio data comprising a captured audio signal with an audio capture device associated with the participant computing device, wherein the captured audio signal corresponds to audio produced by playback of the transmitted audio signal with audio output devices of two or more participant computing devices of the participant cohort. The operations include identifying a matched filter of the plurality of matched filters that most accurately predicts the at least the portion of the audio signal. The operations include generating a delay estimate based on a predictive contribution of one or more of the plurality of coefficients of the matched filter.

Another example aspect of the present disclosure is directed to one or more non-transitory computer-readable media that store instructions that, when executed by one or more processors of a participant computing device, cause the one or more processors to perform operations. The operations include receiving an audio transmission comprising a transmitted audio signal for playback at an audio output device associated with the participant computing device, wherein the participant computing device is one of a plurality of participant computing devices of a participant cohort that are co-located within a same area. The operations include, based on the transmitted audio signal, generating a plurality of matched filters that are each configured to predict at least a portion of an audio signal corresponding to audio caused by playback of the transmitted audio signal, wherein each of the plurality of matched filters comprises a plurality of coefficients. The operations include capturing audio data comprising a captured audio signal with an audio capture device associated with the participant computing device, wherein the captured audio signal corresponds to audio produced by playback of the transmitted audio signal with audio output devices of two or more participant computing devices of the participant cohort. The operations include identifying a matched filter of the plurality of matched filters that most accurately predicts the at least the portion of the audio signal. The operations include iteratively analyzing the one or more coefficients of the plurality of coefficients of the matched filter to select a coefficient from the plurality of coefficients that corresponds to a point at which the matched filter predicts the at least the portion of the audio signal. The operations include generating a delay estimate based on the coefficient. The operations include performing, based at least in part on the delay estimate, an AEC process to remove the audio produced by the playback of the transmitted audio signal with the audio output devices of the two or more participant computing devices from the audio data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
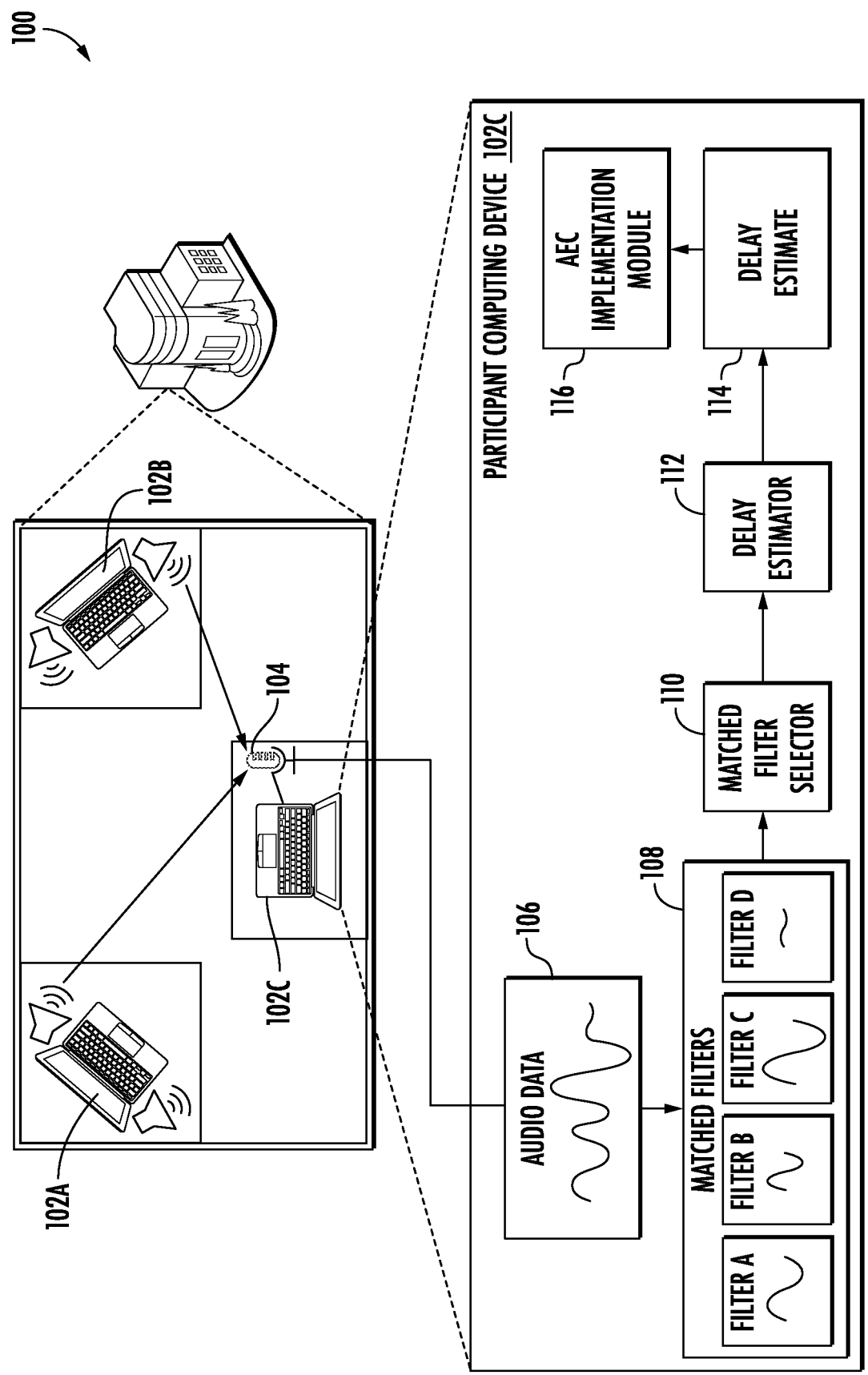
FIG. 1 depicts an overview data flow diagram for generating a delay estimate for Acoustic Echo Cancellation (AEC) with co-located participant computing devices according to some implementations of the present disclosure.

Reference numerals that are repeated across plural figures are intended to identify the same features in various implementations.

DETAILED DESCRIPTION

Generally, the present disclosure is directed to estimating delay to perform echo cancellation for devices that are co-located (e.g., located in the same area). More specifically, with the rising popularity of teleconferencing, it is increasingly common for co-located participants (e.g., participants located within the same room, etc.) to individually participate in the same teleconferencing session (e.g., three co-workers who each have a desk in the same room may individually participate in the same teleconference from their desks).

Teleconferencing generally refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

To further enhance the experience of participants, some teleconferencing services synchronize the audio output devices (e.g., speakers) of co-located participant computing devices (e.g., smartphones, laptops, etc.). However, it is difficult to achieve perfect synchronization, and as such, there is often a slight delay between audio playback at two synchronized participant computing devices. Acoustic Echo Cancellation (AEC) processes, which generally focus on a "first" or "loudest" detected echo, will often miss a second echo caused by the delay between synchronized devices (e.g., the audio from the delayed participant computing device), thus reducing the effectiveness of the AEC process and degrading the teleconference experience for participants.

Accordingly, implementations of the present disclosure propose delay estimation for echo cancellation with co-located devices. For example, a participant computing device can be located in a room with other devices that are all connected to the same teleconference. Each of the devices can obtain the same audio signal for playback (e.g., a broadcast from a teleconference hosting system, etc.). To perform echo cancellation, the participant computing device can generate matched filters based on different portions of the transmitted audio signal that are each configured to predict the same portion of the audio signal (or all of the audio signal). As the other devices begin playback of the audio signal, the participant computing device can capture the audio produced by the playback of the audio signal (e.g., with an associated microphone, etc.). The participant computing device can identify one of the matched filters that best predicts the portion (or all) of the audio signal, and based on one of the coefficients used by the matched filter, can generate a delay estimate for echo cancellation. In such fashion, implementations of the present disclosure can generate a delay estimate to more accurately perform AEC processes to remove the echo caused by unsynchronous playback of audio by co-located devices.

Aspects of the present disclosure provide a number of technical effects and benefits. As one example technical effect and benefit, slight delays in synchronization between co-located participant computing devices can reduce the effectiveness of AEC processes. When echo is not effectively cancelled, the quality of a teleconferencing session can be substantially degraded to the point at which communication is not possible. In turn, co-located participants are forced to switch to alternative audio output devices (e.g., headphones, etc.), cease any form of synchronized audio playback, and/or expend substantial computing resources to further reduce echo (e.g., energy, compute cycles, memory, bandwidth, etc.). However, implementations of the present disclosure can generate a delay estimate that allows AEC processes to effectively remove echo caused by synchronized audio playback with co-located devices, therefore eliminating the need for additional echo cancellation processing while facilitating synchronized audio playback for co-located participants.

With reference now to the Figures, example implementations of the present disclosure will be discussed in further detail.

FIG. 1 depicts an overview data flow diagram 100 for generating a delay estimate for Acoustic Echo Cancellation (AEC) with co-located participant computing devices according to some implementations of the present disclosure. Participant computing devices 102A, 102B, and 102C

(generally, participant computing devices 102) (e.g., smartphones, laptops, desktop computing devices, wearable devices, etc.) are each located within a same area. More specifically, to follow the depicted example, participant computing devices 102 are each laptop computing devices that are located at separate desks within the same office room. Each of the participant computing devices 102 can be connected to a teleconference (e.g., a teleconference hosted by a teleconference computing system, etc.). As depicted, participant computing devices 102A,102B, and 102C can receive an audio transmission that includes an audio signal for playback. The participant computing devices 102A and 102B can cause synchronized playback of the audio signal using audio output devices (e.g., speakers).

An audio capture device 104 associated with the participant computing device 102C can capture audio data 106 that includes a captured audio signal corresponding to audio produced by playback of the transmitted audio signal. An audio capture device can refer to any device or collection of devices that can capture audio produced by a participant (e.g., a spoken utterance). Matched filters 108 can be generated based on different portions of the transmitted audio signal, and can each be configured to predict the same portion of an audio signal that corresponds to audio caused by playback of the transmitted audio signal (e.g., the first portion of the audio signal, etc.). Matched filters can refer to filters that detect the occurrence of a signal or a portion of a signal.

For example, assume that the transmitted audio signal corresponds to a spoken utterance of the words "hello everyone!". One of the matched filters 108 can be generated based on a portion of the transmitted audio signal that includes the word "hello", and another matched filter can be generated based on a portion of the transmitted audio signal that includes the word (everyone). However, both of the aforementioned matched filters can be configured to predict the same portion of a captured audio signal produced by playback of the transmitted audio signal (e.g., the portion including the word "hello"). In other words, the matched filters 108 can be generated using different portions of the transmitted audio signal, and can be configured to predict the same portion of the captured audio signal (e.g., echo caused by playback of the transmitted audio signal).

The participant computing device 102C can process the audio data 106 with the matched filters 108. In conjunction with the matched filter selector 110, the participant computing device 102C can determine metrics that indicate the performance of the matched filters 108 (e.g., a predictive accuracy metric, etc.). The metrics can generally be values or information that measure the performance of the matched filters 108.

For example, assume that matched filter A is generated using an initial portion of the transmitted audio signal, matched filter B is generated using a subsequent portion of the transmitted audio signal, and that both filters are configured to predict the initial portion of the captured audio signal. As the matched filter A is generated using the initial portion of the transmitted audio signal, it is likely that the participant computing device 102C will determine a higher performance metric for the matched filter A than for the matched filter B.

The matched filter selector 110 can select a matched filter that "best" (i.e., most accurately) predicts the portion (or all) of the captured audio signal of the audio data 106. To follow the previous example, assume that the transmitted audio signal includes audio of a spoken utterance of the words "Hello everyone!", and that the audio capture device 104 fails to capture the first word of the spoken utterance (e.g., "Hello"). In this scenario, as the matched filter A is generated based on the initial portion of the transmitted audio signal (e.g., the portion that includes "Hello"), the matched filter A is unlikely to be selected by the matched filter selector 110.

Based on the selected filter from the matched filters 108, delay estimator 112 can generate a delay estimate 114. The delay estimate 114 can be provided to an AEC implementation module 116 (e.g., a module that implements AEC processes using the delay estimate, etc. 0. Generation of the delay estimate using the selected matched filter will be discussed in greater detail with regards to FIG. 3B. In such fashion, implementations of the present disclosure can identify a matched filter that most accurately predicts an audio signal, and can use that signal to generate a delay estimate that facilitates more accurate implementation of AEC processes.

To transmit or receive any data or information, the devices and/or systems of FIG. 1 can utilize various network(s) (e.g., wired networks, wireless networks, etc.). Network(s) and methods of communication will be discussed in greater detail with regards to FIG. 5 (e.g., Network(s) 599 of FIG. 5, etc.).

Figure 2:
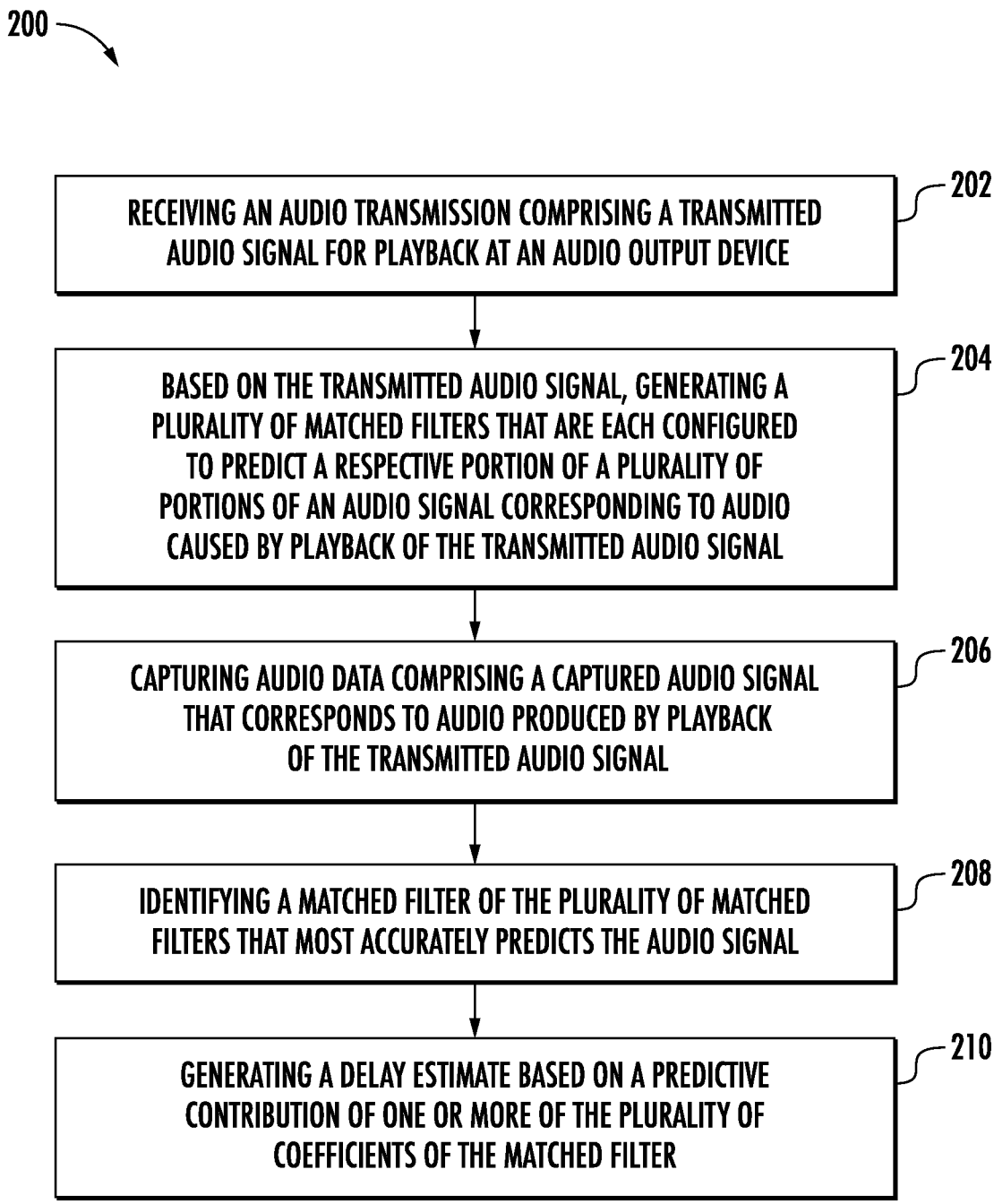
FIG. 2 is a flow diagram of an example method for to perform delay estimation to enhance AEC for removal of echo caused by an attempt at synchronized audio playback from co-located devices, in accordance with some implementations of the present disclosure.

FIG. 2 is a flow diagram of an example method 200 for to perform delay estimation to enhance AEC for removal of echo caused by an attempt at synchronized audio playback from co-located devices, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the AEC implementation module 116 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, processing logic can receive an audio transmission that includes a transmitted audio signal for playback at an audio output device (e.g., speakers, etc.) associated with the participant computing device. For example, the participant computing device can be connected to a teleconference (e.g., a teleconference hosted by a teleconference computing system, a Peer-to-Peer (P2P) teleconference facilitated by the direct exchange of communication data between the participant computing device and other participant computing devices, etc.).

Communication data generally refers to data that carries communications between participants. Communication data can be transmitted between participant computing devices (e.g., directly or indirectly via an intermediary) to facilitate communication between participants associated with the participant computing devices. Communication data can include audio data, video data, image data, audiovisual data, textual data, AR/VR data (e.g., pose data, etc.) or any other type or manner of data that can convey a communicative intent (e.g., emojis or other representations of particular emotions, feelings, and/or actions, animated images, etc.).

Additionally, a number of other participant computing devices that are co-located within a same area of the participant computing device (e.g., located within the same room, within the same semi-enclosed space, etc.) can also be connected to the teleconference. The participant computing device, and the other co-located participant computing devices, can all be assigned to a participant cohort.

A participant "cohort" can refer to a group of participant computing devices that are grouped by location due to being located in the same area. More specifically, each of the participant computing devices in a participant cohort can be co-located with each other (e.g., in the same room, in the same semi-enclosed space, etc.). In other words, the participant computing devices of a participant cohort are generally located within a certain distance of each other (e.g., an audible distance). For example, if an audio source produces audio (e.g., a participant produces a spoken utterance, a glass shatters on the ground, etc.), all of the participant computing devices of a participant cohort will likely be located close enough to detect and capture the audio with their associated audio capture devices (e.g., microphones). Similarly, if audio is played through the speakers of one participant computing device, it is likely that speaker playback will be audible for all participants associated with the participant computing devices of the participant cohort.

More specifically, the audio transmission can be transmitted to the participant computing devices of the participant cohort for synchronous playback of the transmitted audio signal. For example, a teleconference computing system can be hosting the teleconference to which the co-located participant computing devices are connected. The teleconference computing system can determine that the participant computing devices are co-located, and can form a participant cohort that includes the participant computing devices. The teleconference computing system can transmit the audio transmission to the devices of the participant cohort alongside instructions to synchronously cause playback of the audio transmission to enhance the teleconference experience for participants associated with the devices of the participant cohort.

At operation 204, the processing logic can, based on the transmitted audio signal, generate matched filters that are each configured to predict a same portion (or all) of an audio signal that corresponds to audio caused by playback of the transmitted audio signal. For example, the transmitted audio signal can correspond to a 6-second recording of a participant's voice. Each matched filter can be configured to predict the first two-second portion of an audio signal corresponding to audio caused by playback of the 6-second recording. Although two matched filters can be configured to predict the same portion of the 6-second recording, one matched filter can be generated based on the first two-second portion, while another matched filter can be generated based on a subsequent two-second portion. For a more specific example, if the transmitted audio signal corresponds to a spoken utterance of the words "hello everyone", one matched filter can be generated based on a portion including the word "hello", while another matched filter can be generated based on the word "everyone." Both matched filters can be configured to predict the portion that includes the word "everyone".

More specifically, assume that audio signal $x(t)$ is a transmitted audio signal for playback at the devices of the participant cohort, and audio signal $y(t)$ is an audio signal captured at a microphone of the participant computing device that includes audio produced by playback of the transmitted signal $x(t)$ by other devices of the participant cohort. The participant computing device can use the signal $x(t)$ to generate a set of matched filters that are configured to predict the same portions of the signal $y(t)$.

For example, one matched filter can be generated and configured to predict the signal $y(t_0)$ at a time $t_0$ using samples from signal $x(t)$ ranging from $x(t_0)$ to $x(t_{0-L})$ where L is the length of the filter. Another matched filter can be generated and configured to predict the signal $y(t_0)$ at a time $t_0$ using samples from $x(t)$ ranging from $x(t_{0-N})$ to $x(t_{0-N-L})$ where N is a constant different than the length L of the filter. Alternatively, in some implementations, N can be the same value as L, and the other matched filter can be generated and configured using samples from $x(t)$ ranging from $x(t_{0-1})$ to $x(t_{0-2L})$. In some implementations, a portion used to generate one matched filter can overlap with a subsequent portion used to generate a subsequent matched filter.

Each of the matched filters can include coefficients. A coefficient can refer to a value that is used to weight the input signal to the matched filter (e.g., the transmitted audio signal). Generally, when generating the matched filters, the coefficients of each matched filter can be selected such that the output of the filter is maximized when the input matches the portion of the transmitted signal to which the matched filter corresponds. Specifically, in some implementations, the coefficients for each matched filter can be selected to minimize the mean-square error between the output of the filter and the captured audio signal.

At operation 206, the processing logic can capture audio data that includes a captured audio signal. The audio data can store the audio signal using any manner of encoding scheme or file format (e.g., lossless encoding, lossy encoding, etc.). The captured audio signal can correspond to audio produced by playback of the transmitted audio signal by the audio output devices of some (or all) of the participant computing devices of the participant cohort.

More specifically, other devices of the participant cohort that are co-located with the participant computing device can receive the audio transmission for synchronized playback. The participant computing devices can attempt synchronized playback of the audio transmission upon receipt of the transmission. The audio capture device (e.g., microphone, etc.) of the participant computing device can capture audio data that includes a captured audio signal. The captured audio signal can correspond to audio produced by the attempted synchronized playback of the audio transmission by the other devices.

As described previously, it is prohibitively difficult to ensure accurate audio synchronization at all times. As such, it is relatively likely that when attempting synchronized playback, a delay occurred between initiation of playback by one device of the participant cohort and initiation of playback by another device of the participant cohort. Due to this cohort, a conventional AEC process utilized by the participant computing device would likely be successful in cancelling echo produced by the first playback, but would fail to cancel echo produced by the delayed playback. Accordingly, implementations of the present disclosure estimate the delay between the initiation of playback to enhance AEC.

At operation 208, the processing logic can identify one of the matched filters that most accurately predicts the audio signal. The accuracy of each matched filter can be evaluated in any manner. For example, the participant computing device can predict a portion of the captured audio signal, and the participant computing device can determine an accuracy of the matched filter based on the captured audio signal. For another example, the accuracy of a matched filter can be quantified evaluating the captured audio signal after removing the signal predicted by the matched filter from the captured audio signal.

At operation 210, the participant computing device can generate a delay estimate based on a predictive contribution of some (or all) of the coefficients of the identified matched filter. For example, the prediction error energy of each filter coefficient can be sequentially plotted. The first plotted coefficient that in which the prediction error energy is less than 0 can be selected, and that coefficient can be utilized as the estimated delay, or can be used to determine the delay estimate. Determination of the delay estimate will be discussed in greater detail with regards to FIG. 3B.

For example, in some implementations, the participant computing device can iteratively analyze the coefficients of the matched filter to identify a predictive coefficient. The predictive coefficient can be the coefficient that first predicts the respective portion (or all) of the audio signal with a degree of accuracy greater than a threshold degree of accuracy. The delay estimate can be determined based on the predictive coefficient, or the delay estimate can be the predictive coefficient.

In some implementations, to iteratively analyze the coefficients, the participant computing device can, for one (or more) iterations, perform a smoothing process to a coefficient based on a weighting of a corresponding frame of the portion of the captured audio signal that the matched filter is associated with. The participant computing device can generate a prediction metric for the coefficient and can determine whether the prediction metric (e.g., error prediction energy) is greater than a threshold metric.

In some implementations, the participant computing device can analyze every fourth coefficient of the matched filter. More specifically, assume that the matched filter includes N coefficients, where N is greater than 4. The participant computing device can iteratively analyze a set of $M_{4N}$ coefficients that includes every fourth coefficient of the N coefficients. For example, if the matched filter includes N=12 coefficients, the set of $M_{4N}$ coefficients can include the first coefficient, the fourth coefficient, the eighth coefficient, and the twelfth coefficient of the N coefficients.

In particular, the participant computing device can iteratively analyze the set of $M_{4N}$ coefficients to optimize the processing of the coefficients when utilizing certain instruction set architectures. For example, the participant computing device can determine the set of $M_{4N}$ coefficients, and can generate the prediction metric for the coefficient with a computing device that utilizes an Advanced Vector Extensions 2 (AVX2), Streaming Single Instruction, Multiple Data (SIMD) Extensions (SSE), and/or Advanced SIMD (NEON) instruction set architecture.

Figure 3A:
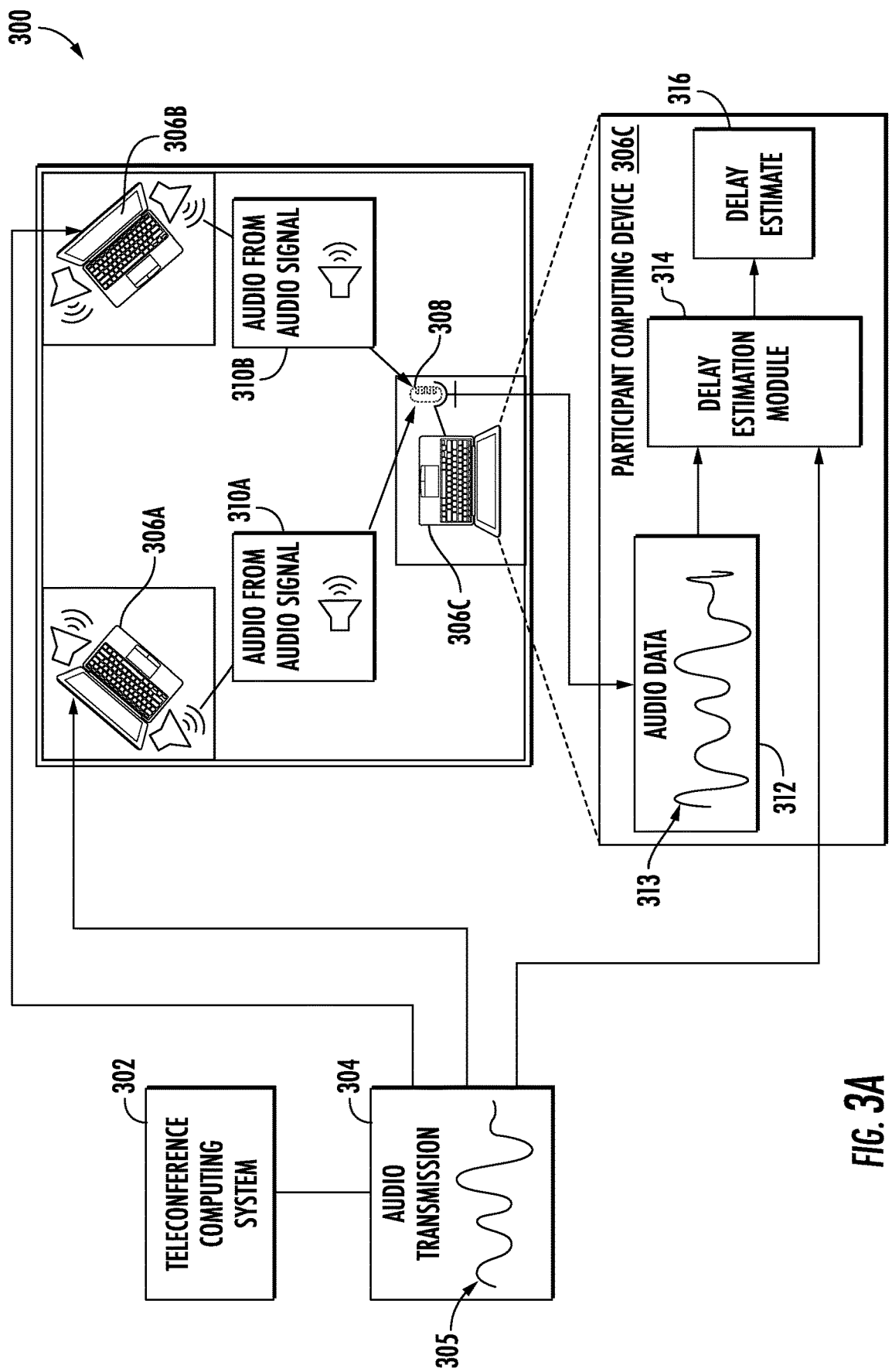
FIG. 3A illustrates a more detailed data flow diagram for generating a delay estimate for AEC with co-located participant computing devices according to some implementations of the present disclosure.

FIG. 3A illustrates a more detailed data flow diagram 300 for generating a delay estimate for AEC with co-located participant computing devices according to some implementations of the present disclosure. More specifically, a teleconference computing system 302 can transmit an audio transmission 304 that includes a transmitted audio signal 305 to participant computing devices 306A, 306B and 306C (generally, participant computing devices 306) of a participant cohort. Upon receipt, the participant computing devices 306A and 306B can attempt synchronized playback of the transmitted audio signal 305. The attempted synchronized playback of the transmitted audio signal 305 can produce audio 310A and 310B (generally, audio 310).

The audio capture device 308 of the participant computing device 306C can capture the audio 310 produced by playback of the transmitted audio signal 305. More specifically, the participant computing device 306C can utilize the audio capture device 308 to capture audio data 312 that includes a captured audio signal 313 that corresponds to the audio 310. The audio data 312 and the transmitted audio signal 305 (e.g., audio data storing the transmitted audio signal 305 received via the audio transmission 304) can both be processed with a delay estimation module 314 to obtain a delay estimate 316.

Figure 3B:
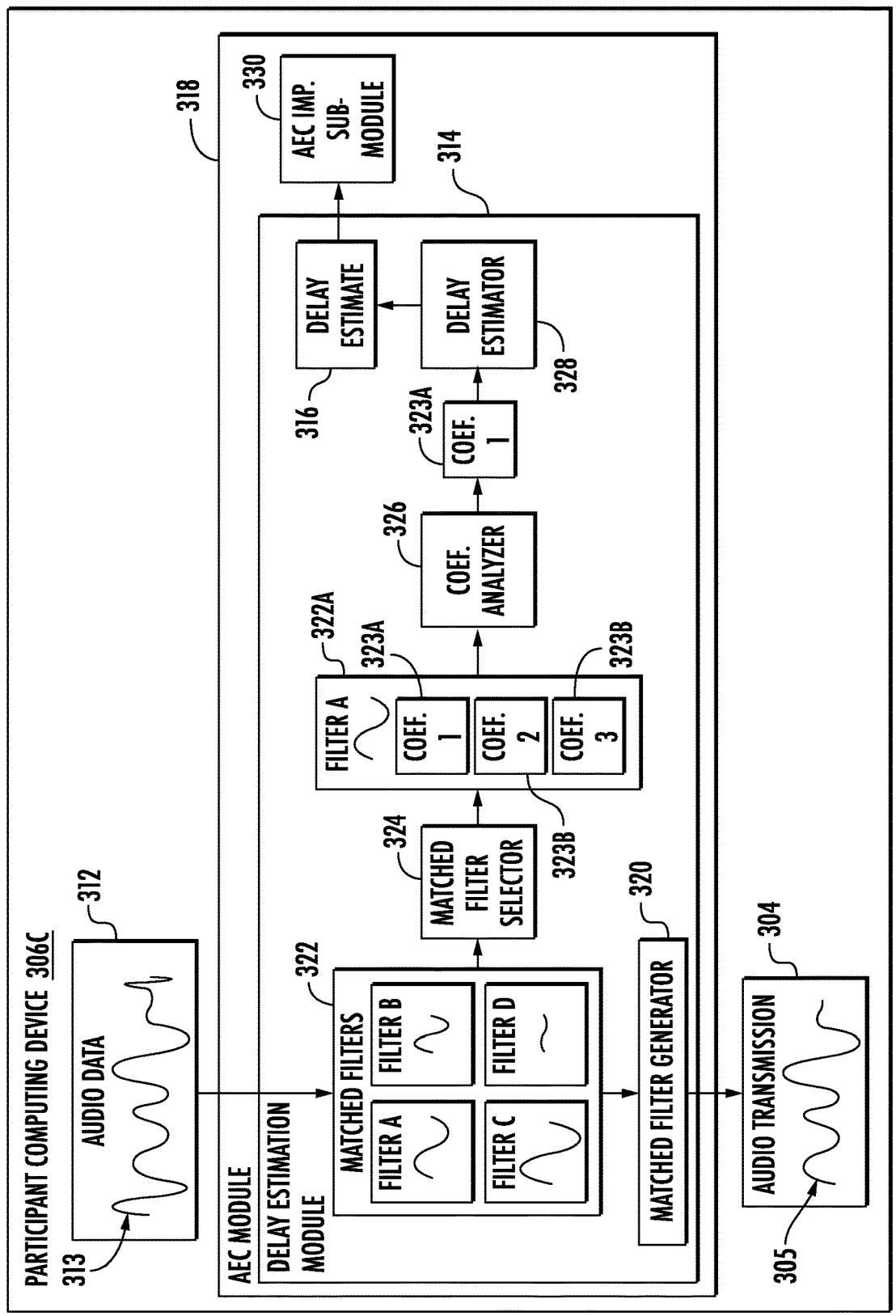
FIG. 3B is a block diagram for generating and utilizing a delay estimate to perform AEC for echo caused by synchronous playback of audio by co-located participant computing devices according to some implementations of the present disclosure.

Turning to FIG. 3B, FIG. 3B is a block diagram for generating and utilizing a delay estimate to perform AEC for echo caused by synchronous playback of audio by co-located participant computing devices according to some implementations of the present disclosure. Specifically, the participant computing device 306C (e.g., participant computing device 306C of FIG. 3A) can obtain the audio data 312 which includes captured audio signal 313, and audio transmission 304 which includes transmitted audio signal 305 as described with regards to FIG. 3A.

The AEC module 318 can be a module that performs AEC processes to reduce, or eliminate, echo present in audio data. In some implementations, AEC module 318 can include the delay estimation module 314. Alternatively, in some implementations, the AEC module 318 can be separate from the delay estimation module 314, and can receive the delay estimate 316 from the delay estimation module 314.

The AEC module 318 can include matched filter generator 320. The matched filter generator 320 can generate and/or configure matched filters 322 based on the transmitted audio signal 305. For example, the matched filter generator 320 can generate one of the matched filters 322 based on an initial portion of the transmitted audio signal 305, and can generate another one of the matched filters 322 based on a subsequent portion of the transmitted audio signal 305.

The matched filters 322 can be configured (e.g., by the matched filter generator 320, etc.) to predict a same portion (or all) of the captured audio signal 313. The participant computing device 306C can process the audio data 312 with the matched filters 322. The participant computing device 306C can utilize matched filter selector 324 to identify which of the matched filters 322 most accurately predicts the portion of the captured audio signal 313. To follow the depicted example, the participant computing device 306C can process the audio data 312 with the matched filters 322. Each of the matched filters 322 can generate information that indicates a degree of predictive accuracy of the matched filter. Based on the information from the matched filters 322, the matched filter selector 324 can identify the filter 322A as the matched filter that most accurately predicts the captured audio signal 313.

As described previously, each of the matched filters 322 can include coefficients. The coefficients can be values that are utilized to weight the input signal (e.g., captured audio signal 313) to the matched filter. The filter 322A can include coefficients 323A, 323B, and 323C (generally, coefficients 323). The coefficient analyzer 326 can perform a smoothing process on the coefficients 323 based on the weighting of the frames of the portion of the captured audio signal 313 that corresponds to the filter 322A. Once smoothed, the coefficient analyzer 326 can generate a prediction metric for the coefficients 323, and based on the prediction metrics, identify a predictive coefficient that first predicts the portion of the captured audio signal 313 with a degree accuracy greater than a threshold degree of accuracy.

To follow the depicted example, the coefficient analyzer 326 can perform the smoothing process for the coefficient 323A, and can determine a degree of predictive accuracy associated with a prediction by the coefficient 323A of the respective portion of the transmitted audio signal 313. Based on the degree of predictive accuracy associated with a prediction by the coefficient 323A, the coefficient analyzer 326 can select the coefficient 323A as a predictive coefficient.

The coefficient analyzer 326 can provide the predictive coefficient 323A to the delay estimator 328. In some implementations, the delay estimator 328 can provide the predictive coefficient 323A as the delay estimate 316 to an AEC implementation sub-module 330 that implements AEC processes. Alternatively, in some implementations, the delay estimator 328 can determine the delay estimate 316 based on the predictive coefficient 323A.

More generally, it should be noted that the delay estimate 316 can be utilized in any manner to enhance the performance of AEC processes by the AEC implementation sub-module 330. For example, the AEC implementation sub-module 330 can enhance the performance of any type of conventional AEC process via direct or indirect usage of the delay estimate 316.

Figure 4:
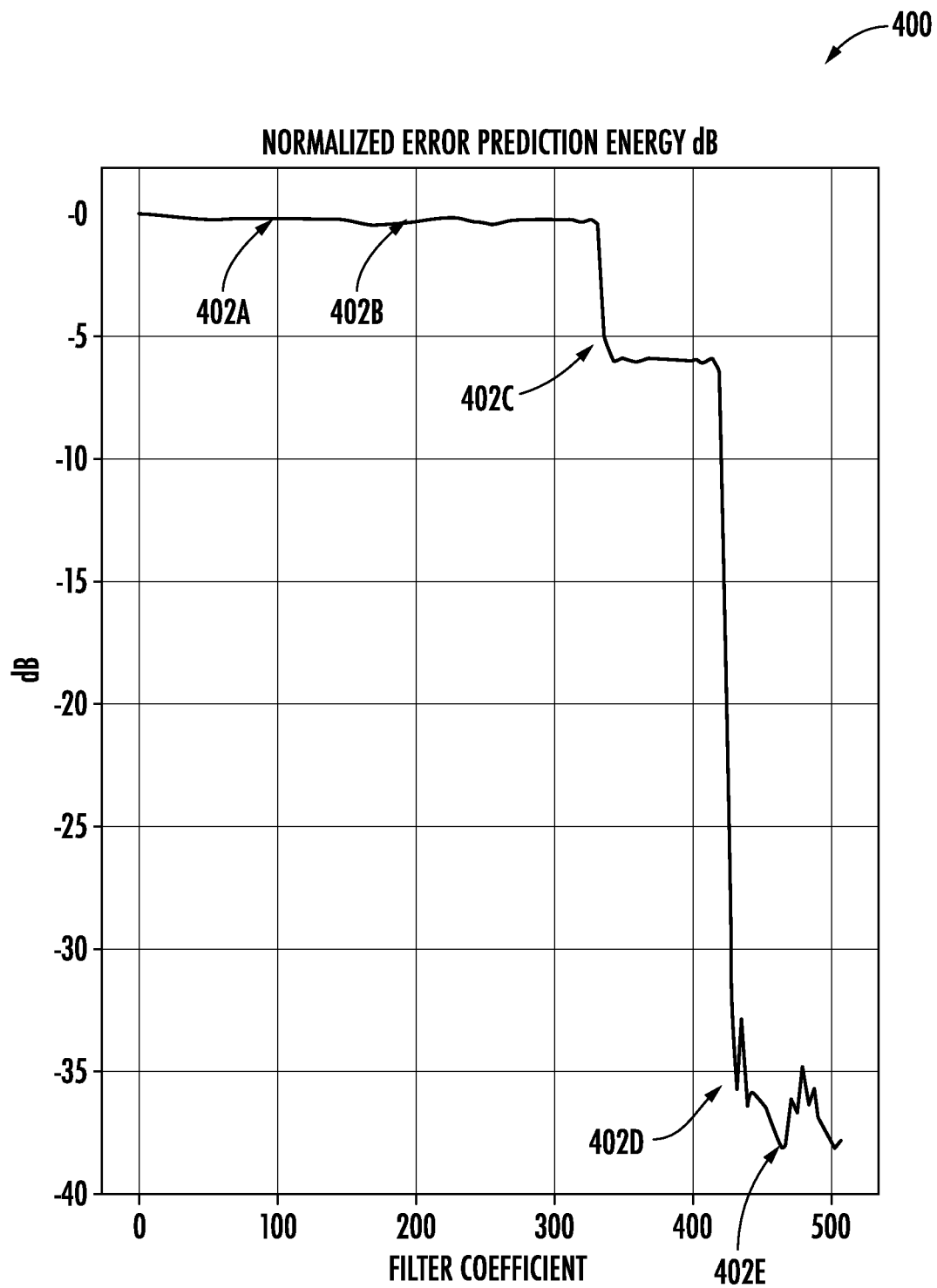
FIG. 4 is a graph that plots the normalized error prediction energy (in dB) with filter coefficients of a selected filter according to some implementations of the present disclosure.

FIG. 4 is a graph 400 that plots the normalized error prediction energy (in dB) with filter coefficients of a selected filter according to some implementations of the present disclosure. FIG. 4 will be discussed in conjunction with FIG. 3B. In particular, information illustrated in FIG. 4 can be determined via analysis of the coefficients 323 of the matched filter 322A by the coefficient analyzer 326 of FIG. 3B.

More specifically, the coefficient analyzer 326 can evaluate some (or all) of the coefficients of a matched filter to determine a prediction metric for the coefficient(s). A prediction metric can indicate a contribution by the coefficient to the prediction of the audio signal made by the matched filter. For example, assume a matched filter is generated/configured to predict a portion of an audio signal. The coefficients of the matched filter can be used iteratively by the matched filter while predicting the portion of the audio signal. The prediction metrics for some of the coefficients can indicate that the coefficients do not contribute to the matched filters prediction of the portion of the audio signal. Conversely, the prediction metric for other coefficients can indicate whether the coefficients contributed to the prediction, and to what degree the coefficients contributed. In other words, the prediction metric for a coefficient can indicate whether the coefficient was used by the matched filter when predicting the portion of the audio signal.

In some implementations, the prediction metric can be a normalized error prediction energy. To follow the depicted example, graph 400 plots prediction metrics (e.g., normalized error prediction energy) for the coefficients of a matched filter (e.g., prediction metrics on the Y axis and coefficients on the X axis). As depicted, coefficients 402A (100) and 402B (200) have a normalized error prediction energy (e.g., prediction metric) of 0 (e.g., as determined by the coefficient analyzer 326). A prediction metric with a value of 0 can indicate that a corresponding coefficient, such as coefficients 402A (100) and 402B (200) did not contribute to the matched filters prediction of the audio signal. In other words, the prediction metrics for coefficients 402A (100) and 402B (200) indicate that the coefficients 402A and 402B were not used by the matched filter when predicting the audio signal.

Conversely, coefficient 402C (330) is sequentially the first coefficient with a normalized prediction energy different than 0 (e.g., −5). In some implementations, the coefficient selected (e.g., by the coefficient analyzer 326 of FIG. 3) can be the first coefficient to have a prediction metric greater than a threshold prediction metric. In other words, a normalized error prediction energy of 0 can be a threshold prediction metric, and the coefficient 402C (330) can be the first coefficient to have a prediction metric greater than the threshold prediction metric.

Alternatively, in some implementations, the threshold prediction metric can be greater (or less) than 0. For example, assume that the threshold prediction metric is a normalized error prediction energy of −20 dB. The coefficient 402C (330) has a normalized error prediction energy of −5 dB, and as such, does not exceed the threshold prediction metric and therefore would not be selected (e.g., by the coefficient analyzer 326). Conversely, the coefficient 402D (420) has a normalized error prediction energy of −35 db, and as such, exceeds the threshold prediction metric and therefore would be selected.

Alternatively, in some implementations, the coefficient with a highest prediction metric can be selected rather than the first coefficient with a prediction metric greater than a threshold. For example, coefficient 402E (−40) can be selected due to coefficient 402E having the highest normalized error prediction energy. It should be noted that, although normalized energy prediction energy is provided as an example prediction metric, the prediction metric can be any type or manner of metric or information that indicates a relative contribution or "importance" of a coefficient of the matched filter.

Figure 5:
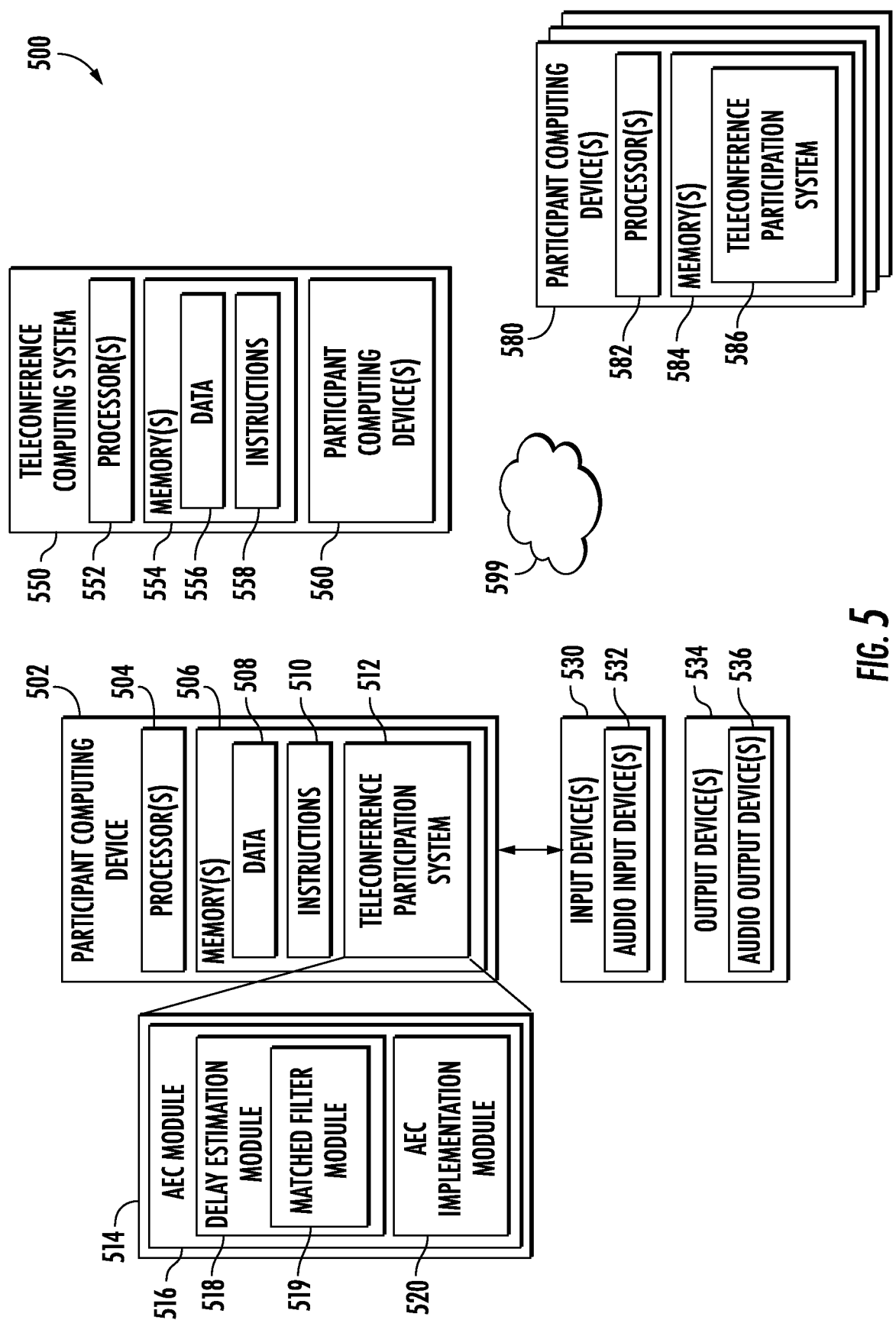
FIG. 5 depicts a block diagram of an example computing environment that performs delay estimation for echo cancellation with co-located participant computing devices according to example implementations of the present disclosure.

FIG. 5 depicts a block diagram of an example computing environment 500 that performs delay estimation for echo cancellation with co-located participant computing devices according to example implementations of the present disclosure. The computing environment 500 includes a participant computing device 502 that is associated with a participant in a teleconference, a teleconference computing system 550, and, in some implementations, other participant computing device(s) 580 respectively associated with other participants(s) in the teleconference.

The participant computing device 502 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), etc.

In particular, the participant computing device 502 can, in some implementations, be a device for participating in teleconferences (e.g., the live exchange of communications data between multiple participants). For example, the participant computing device 502 can capture audio (e.g., spoken utterances) produced by a participant (e.g., a human user of the participant computing device 502). The audio can be captured as an audio signal and can be transmitted as audio data to a system that hosts a teleconference, or can be transmitted directly to other participant computing devices. The participant computing device 502 can, in some implementations, process or otherwise modify the audio data prior to transmission. For example the participant computing device can perform AEC processes to the audio data to reduce, or eliminate, any echo within the audio. For another example, the participant computing device 502 can encode or compress the audio data prior to transmission. Similarly, the participant computing device 502 can receive and decode audio data, and can play audio (i.e., audio signals) carried by the audio data using audio output devices.

It should be noted that the participant computing device 502 is not limited to the exchange of audio data when participating in a teleconference. Rather, the participant computing device 502 can both receive and transmit a wide variety of communication data in real-time. For example, to participate in videoconferences, audioconferences, multimedia conferences, AR/VR conferences, the participant computing device participant computing device can capture, encode, compress, transmit, receive, decode, play, etc. a number of different types of communication data (e.g., video data, audio data, textual content, AR/VR data, etc.).

The participant computing device 502 includes processor(s) 504 and memory(s) 506. The processor(s) 504 can be any suitable processing device (e.g., a processor core, a microprocessor, an ASIC, an FPGA, a controller, a microcontroller, etc.) and can be one processor or processors that are operatively connected. The memory 506 can include non-transitory computer-readable storage media(s), such as RAM, ROM, EEPROM, EPROM, flash memory devices, magnetic disks, etc., and combinations thereof. The memory 506 can store data 508 and instructions 510 which are executed by the processor 504 to cause the participant computing device 502 to perform operations.

In particular, the memory 506 of the participant computing device 502 can include a teleconference participation system 512. The teleconference participation system 512 can facilitate participation in a teleconference by a participant associated with the participant computing device 502 (e.g., a teleconference hosted or otherwise orchestrated by teleconference computing system 550, etc.). To facilitate teleconference participation, the teleconference participation system 512 can include service module(s) 514 which, by providing various services, can collectively facilitate participation in a teleconference.

For example, the teleconference service module(s) 514 can include an AEC module 516. Generally, the AEC module 516 can be utilized by the participant computing device 502 to perform AEC processes to remove or eliminate echo from audio prior to transmission of audio data. More specifically, the AEC module 516 can include a delay estimation module 518 and an AEC implementation module 520. The delay estimation module 518 can estimate the delay between audio from multiple co-located audio sources, and the AEC implementation module 520 can utilize a delay estimate generated using the delay estimation module 518 to implement and enhance AEC processes.

For example, assume that the participant computing device 502 is co-located with multiple other participant computing devices (e.g., participant computing devices 580, etc.) within a same area (e.g., the same office room, the same auditorium, etc.). Each of the co-located participant computing devices can attempt to cause synchronized playback of an audio signal received from a teleconference orchestrating system (e.g., teleconference computing system 550). The participant computing device 502 can capture audio produced by the attempted synchronized playback. As described previously, synchronized playback often includes a slight delay between initiation of playback by participant computing devices. The delay estimation module 518 can initially generate a series of matched filters using different portions of a transmitted audio signal, and can configure each of the series of matched filters to predict the same portion of the transmitted audio signal (e.g., using the matched filter module 519). The delay estimation module 518 can then be used to select a matched filter that best predicts the audio signal, and based on a coefficient of the matched filter, generate a delay estimate. The AEC implementation module 520 can receive the delay estimate and enhance AEC processes based on the delay estimate to more effectively remove any echo caused by playback of the audio signal by co-located devices (e.g., devices in close proximity to the participant computing device 502).

The participant computing device 502 can also include input device(s) 530 that receive inputs from a participant, or otherwise capture data associated with a participant. For example, the input device(s) 530 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 502 can include, or can be communicatively coupled to, input device(s) 530. For example, the input device(s) 530 can include a camera device that can capture two-dimensional video data of a participant associated with the participant computing device 502 (e.g., for broadcasting, etc.). In some implementations, the input device(s) 530 can include a number of camera devices communicatively coupled to the participant computing device 502 that are configured to capture image data from different perspectives for generation of three-dimensional pose data/representations (e.g., a representation of a user of the participant computing device 502, etc.).

In some implementations, the input device(s) 530 can include sensor devices configured to capture sensor data indicative of movements of a participant associated with the teleconference computing system 502 (e.g., accelerometer(s), Global Positioning Satellite (GPS) sensor(s), gyroscope(s), infrared sensor(s), head tracking sensor(s) such as magnetic capture system(s), an omnidirectional treadmill device, sensor(s) configured to track eye movements of the user, etc.).

In particular, the input device(s) 530 can include audio input device(s) 532 (e.g., microphones, microphone arrays, etc.). For example, the audio capture device(s) 532 can be, or otherwise include, a microphone array that captures high-quality audio data and provides the data as an audio input signal. For another example, the audio capture device(s) 532 can be a directional microphone that captures audio and a direction from which the audio was captured.

In some implementations, the participant computing device 02 can include, or be communicatively coupled to, output device(s) 534. Output device(s) 534 can be, or otherwise include, device(s) configured to output audio data, image data, video data, etc. For example, the output device(s) 534 can include a two-dimensional display device (e.g., a television, projector, smartphone display device, etc.). For another example, the output device(s) 534 can include display devices for an augmented reality device or virtual reality device.

In particular, the output device(s) 534 can include audio output device(s) 536. The audio output device(s) 536 can be any type or manner of audio device that can create, or otherwise simulate, stereo audio. For example, the audio output device(s) 536 can be a wearable audio output device (e.g., wired or wireless headphones, earbuds, bone conduction headphones, portable stereo simulation speakers, etc.). For another example, the audio output device(s) 536 can be multiple discrete audio output devices within a single audio output device (e.g., a soundbar device that simulates stereo audio). For yet another example, the audio output device(s)

536 can be separate audio output devices that produce stereo audio (e.g., multiple networked passive speakers, a wireless mesh speaker setup, etc.).

The teleconference computing system 550 includes processor(s) 552 and a memory 554. The processor(s) 552 can be any suitable processing device (e.g., a processor core, a microprocessor, an ASIC, an FPGA, a controller, a microcontroller, etc.) and can be one processor or processors that are operatively connected. The memory 554 can include non-transitory computer-readable storage media(s), such as RAM, ROM, EEPROM, EPROM, flash memory devices, magnetic disks, etc., and combinations thereof. The memory 554 can store data 556 and instructions 558 which are executed by the processor 552 to cause the teleconference computing system 550 to perform operations.

In some implementations, the teleconference computing system 550 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 550 can be, or otherwise include, physical processing devices, such as processing nodes within a cloud computing network (e.g., nodes of physical hardware resources).

The teleconference computing system 550 can facilitate the exchange of communication data within a teleconference using the teleconference service system 560. More specifically, the teleconference computing system 550 can utilize the teleconference service system 560 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 550 can utilize the teleconference service system 560 to handle any frontend or backend services directed to providing a teleconference. For example, the teleconference service system 560 can receive and broadcast (i.e., relay) data (e.g., video data, audio data, etc.) between the participant computing device 502 and participant computing device(s) 580. For another example, the teleconference service system 560 can facilitate direct communications between the participant computing device 502 and participant computing device(s) 580 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 560 can provide a videoconference service for multiple participants. One of the participants can transmit audio and video data to the teleconference service system 560 using a participant device (e.g., participant computing device 502, etc.). A different participant can transmit audio data to the teleconference service system 560 with a different participant computing device. The teleconference service system 560 can receive the data from the participants and broadcast the data to each computing system.

As another example, the teleconference service system 560 can implement an augmented reality (AR) or virtual reality (VR) conferencing service for multiple participants. One of the participants can transmit AR/VR data sufficient to generate a three-dimensional representation of the participant to the teleconference service system 560 via a device (e.g., video data, audio data, sensor data indicative of a pose and/or movement of a participant, etc.). The teleconference service system 560 can transmit the AR/VR data to devices of the other participants. In such fashion, the teleconference service system 560 can facilitate any type or manner of teleconferencing services to multiple participants.

It should be noted that the teleconference service system 560 can facilitate the flow of data between participants (e.g., participant computing device 502, participant computing device(s) 580, etc.) in any manner that is sufficient to implement the teleconference service. In some implementations, the teleconference service system 560 can be configured to receive data from participants, decode the data, encode the data, broadcast the data to other participants, etc. For example, the teleconference service system 560 can receive encoded video data from the participant computing device 502. The teleconference service system 560 can decode the video data according to a video codec utilized by the participant computing device 502. The teleconference service system 560 can encode the video data with a video codec and broadcast the data to participant computing devices.

In some implementations, the teleconference computing system 550 includes, or is otherwise implemented by, server computing device(s). In instances in which the teleconference computing system 550 includes multiple server computing devices, such server computing devices can operate according to sequential computing architectures, parallel computing architectures, or some combination thereof.

In some implementations, the transmission and reception of data by teleconference computing system 550 can be accomplished via the network 599. For example, in some implementations, the participant computing device 502 can capture video data, audio data, multimedia data (e.g., video data and audio data, etc.), sensor data, etc. and transmit the data to the teleconference computing system 550. The teleconference computing system 550 can receive the data via the network 599.

In some implementations, the teleconference computing system 550 can receive data from the participant computing device(s) 502 and 580 according to various encryption scheme(s) (e.g., codec(s), lossy compression scheme(s), lossless compression scheme(s), etc.). For example, the participant computing device 502 can encode audio data with an audio codec, and then transmit the encoded audio data to the teleconference computing system 550. The teleconference computing system 550 can decode the encoded audio data with the audio codec. In some implementations, the participant computing device 502 can dynamically select between a number of different codecs with varying degrees of loss based on conditions (e.g., available network bandwidth, accessibility of hardware/software resources, etc.) of the network 599, the participant computing device 502, and/or the teleconference computing system 550. For example, the participant computing device 502 can dynamically switch from audio data transmission according to a lossy encoding scheme to audio data transmission according to a lossless encoding scheme based on a signal strength between the participant computing device 502 and the network 599.

The teleconference computing system 550 and the participant computing device 502 can communicate with the participant computing device(s) 580 via the network 599. The participant computing device(s) 580 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 580 includes processor(s) 582 and a memory 584 as described with regards to the participant computing device 502. Specifically, the participant computing device(s) 580 can be the same, or similar, device(s) as the participant computing device 502. For example, the participant computing device(s) 580 can each include a teleconference participation system 586 that includes at least some of the modules 514 of the teleconference participation system 512. For another example, the participant computing device(s) 580 may include, or may be communicatively coupled to, the same type of input and output devices as described with regards to input device(s) 530 and output device(s) 534 (e.g., device(s) 532, device(s) 536, etc.). Alternatively, in some implementations, the participant computing device(s) 580 can be different devices than the participant computing device 502, but can also facilitate teleconferencing with the teleconference computing system 550. For example, the participant computing device 502 can be a laptop and the participant computing device(s) 580 can be smartphone(s).

The network 599 can be any type of communications network, such as a local area network (e.g., intranet), wide area network (e.g., Internet), or some combination thereof and can include any number of wired or wireless links. In general, communication over the network 599 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Broadcast: as used herein, the terms "broadcast" or "broadcasting" generally refers to any transmission of data (e.g., audio data, video data, AR/VR data, etc.) from a central entity (e.g., computing device, computing system, etc.) for potential receipt by one or more other entities or devices. A broadcast of data can be performed to orchestrate or otherwise facilitate a teleconference that includes a number of participants. For example, a central entity, such as a teleconference server system, can receive an audio transmission from a participant computing device associated with one participant and broadcast the audio transmission to a number of participant computing devices associated with other participants of a teleconference session. For another example, a central entity can detect that direct peer-to-peer data transmission between two participants in a private teleconference is not possible (e.g., due to firewall settings, etc.) and can serve as a relay intermediary that receives and broadcasts data transmissions between participant computing devices associated with the participants. In some implementations, broadcast or broadcasting can include the encoding and/or decoding of transmitted and/or received data. For example, a teleconference computing system broadcasting video data can encode the video data using a codec. Participant computing devices receiving the broadcast can decode the video using the codec.

In some implementations, a broadcast can be, or otherwise include, wireless signaling that carries data, such as communications data, received in a transmission from a participant computing device. Additionally, or alternatively, in some instances, a broadcast can carry data obtained from a data store, storage device, content provider, application programming interface (API), etc. For example, a central entity can receive transmissions of audio data from a number of participant computing devices. The central entity can broadcast the audio data alongside video data obtained from a video data repository. As such, the broadcast of data is not limited to data received via transmissions from participant computing devices within the context of a teleconference.

Communications data: as used herein, the term "communications data" generally refers to any type or manner of data that carries a communication, or otherwise facilitates communication between participants of a teleconference. Communications data can include audio data, video data, textual data, augmented reality/virtual reality (AR/VR) data, etc. As an example, communications data can collectively refer to audio data and video data transmitted within the context of a videoconference. As another example, within the context of an AR/VR conference, communications data can collectively refer to audio data and AR/VR data, such as positioning data, pose data, facial capture data, etc. that is utilized to generate a representation of the participant within a virtual environment. As yet another example, communications data can refer to textual content provided by participants (e.g., via a chat function of the teleconference, via transcription of audio transmissions using text-to-speech technologies, etc.).

Cloud: as used herein, the term "cloud" or "cloud computing environment" generally refers to a network of interconnected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.).

Transmission: As used herein, the term "transmission" generally refers to any sending, providing, etc. of data (e.g., communications data) from one entity to another entity. For example, a participant computing device can directly transmit audio data to another participant computing device. For another example, a participant computing device can transmit video data to a central entity orchestrating a teleconference, and the central entity can broadcast the audio data to other entities participating in the teleconference. Transmission of data can occur over any number of wired and/or wireless communications links or devices. Data can be transmitted in various forms and/or according to various protocols. For example, data can be encrypted and/or encoded prior to transmission and decrypted and/or decoded upon receipt.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
   receiving, by a participant computing device comprising one or more processor devices, an audio transmission comprising a transmitted audio signal for playback at an audio output device associated with the participant computing device, wherein the participant computing device is one of a plurality of participant computing devices of a participant cohort that are co-located within a same area;
   based on the transmitted audio signal, generating, by the participant computing device, a plurality of matched filters that are configured to predict at least a portion of an audio signal corresponding to audio caused by playback of the transmitted audio signal, wherein each of the plurality of matched filters comprises a plurality of coefficients;
   capturing, by the participant computing device, audio data comprising a captured audio signal with an audio capture device associated with the participant computing device, wherein the captured audio signal corresponds to audio produced by playback of the transmitted audio signal with audio output devices of two or more participant computing devices of the participant cohort;
   identifying, by the participant computing device, a matched filter of the plurality of matched filters that most accurately predicts the at least the portion of the audio signal; and
   generating, by the participant computing device, a delay estimate based on a predictive contribution of one or more of the plurality of coefficients of the matched filter.

2. The computer-implemented method of claim 1, wherein capturing the audio data comprises capturing, by the participant computing device, audio data comprising audio produced by an attempt at synchronized playback of an audio signal with the audio output devices of the two or more participant computing devices.

3. The computer-implemented method of claim 1, wherein the method further comprises providing, by the participant computing device, the delay estimate to an Acoustic Echo Cancellation (AEC) module.

4. The computer-implemented method of claim 3, wherein the method further comprises performing, by the participant computing device based at least in part on the delay estimate, an AEC process to remove the audio produced by the playback of the audio signal with the audio output devices of the two or more participant computing devices from the audio data.

5. The computer-implemented method of claim 1, wherein generating the delay estimate based on the predictive contribution of the one or more of the plurality of coefficients of the matched filter comprises:
iteratively analyzing, by the participant computing device, the one or more coefficients of the plurality of coefficients of the matched filter to select a coefficient from the plurality of coefficients that corresponds to a first point at which the matched filter predicts the at least the portion of the audio signal; and
generating, by the participant computing device, the delay estimate based on the coefficient.

6. The computer-implemented method of claim 5, wherein iteratively analyzing, by the participant computing device, the plurality of coefficients comprises:
for one or more iterations:
performing, by the participant computing device, a smoothing process to a coefficient of the plurality of coefficients based on a weighting of a corresponding frame of a respective plurality of frames of the portion of the audio signal associated with the matched filter;
determining, by the participant computing device, a prediction metric indicative of a contribution by the coefficient to prediction of the at least the portion of the audio signal by the matched filter; and
based on the prediction metric, determining, by the participant computing device, whether to select the coefficient.

7. The computer-implemented method of claim 6, wherein the prediction metric comprises a normalized error prediction energy.

8. The computer-implemented method of claim 6, wherein the plurality of coefficients comprises N coefficients where N>4, and wherein a set of $M_{4N}$ coefficients comprises every fourth coefficient of the N coefficients;
wherein performing a smoothing process to a coefficient of the plurality of coefficients comprises performing, by the participant computing device, the smoothing process to every coefficient of the set of $M_{4N}$ coefficients; and
wherein generating a predictive metric for the coefficient comprises generating, by the participant computing device, the predictive metric for the coefficient using a first computing device of the one or more computing devices of the participant computing device, wherein the first computing device utilizes an Advanced Vector Extensions 2 (AVX2), Streaming Single Instruction, Multiple Data (SIMD) Extensions (SSE), and/or Advanced SIMD (NEON) instruction set architecture.

9. A participant computing device, comprising:
one or more processors; and
one or more non-transitory computer-readable media that store instructions that, when executed by the one or more processors, cause the participant computing device to perform operations, the operations comprising:
receiving an audio transmission comprising a transmitted audio signal for playback at an audio output device associated with the participant computing device, wherein the participant computing device is one of a plurality of participant computing devices of a participant cohort that are co-located within a same area;
based on the transmitted audio signal, generating a plurality of matched filters that are configured to predict at least a portion of an audio signal corresponding to audio caused by playback of the transmitted audio signal, wherein each of the plurality of matched filters comprises a plurality of coefficients;
capturing audio data comprising a captured audio signal with an audio capture device associated with the participant computing device, wherein the captured audio signal corresponds to audio produced by playback of the transmitted audio signal with audio output devices of two or more participant computing devices of the participant cohort;
identifying a matched filter of the plurality of matched filters that most accurately predicts the at least the portion of the audio signal; and
generating a delay estimate based on a predictive contribution of one or more of the plurality of coefficients of the matched filter.

10. The participant computing device of claim 9, wherein capturing the audio data comprises capturing audio data comprising audio produced by an attempt at synchronized playback of an audio signal with the audio output devices of the two or more participant computing devices.

11. The participant computing device of claim 9, wherein the operations further comprise providing the delay estimate to an Acoustic Echo Cancellation (AEC) module.

12. The participant computing device of claim 11, wherein the operations further comprise performing, based at least in part on the delay estimate, an AEC process to remove the audio produced by the playback of the audio signal with the audio output devices of the two or more participant computing devices from the audio data.

13. The participant computing device of claim 9, wherein generating the delay estimate based on the predictive contribution of the one or more of the plurality of coefficients of the matched filter comprises:
iteratively analyzing the one or more coefficients of the plurality of coefficients of the matched filter to select a coefficient from the plurality of coefficients that corresponds to a first point at which the matched filter predicts the at least the portion of the audio signal; and
generating the delay estimate based on the coefficient.

14. The participant computing device of claim 13, wherein iteratively analyzing the plurality of coefficients comprises:
for one or more iterations:
performing a smoothing process to a coefficient of the plurality of coefficients based on a weighting of a corresponding frame of a respective plurality of frames of the portion of the audio signal associated with the matched filter;
determining a prediction metric indicative of a contribution by the coefficient to prediction of the at least the portion of the audio signal by the matched filter; and
based on the prediction metric, determining whether to select the coefficient.

15. The participant computing device of claim 14, wherein the prediction metric comprises a normalized error prediction energy.

16. The participant computing device of claim 14, wherein the plurality of coefficients comprises N coefficients where N>4, and wherein a set of $M_{4N}$ coefficients comprises every fourth coefficient of the N coefficients;
wherein performing a smoothing process to a coefficient of the plurality of coefficients comprises performing the smoothing process to every coefficient of the set of $M_{4N}$ coefficients; and
wherein generating a predictive metric for the coefficient comprises generating the predictive metric for the coefficient using a first computing device of the one or more computing devices of the participant computing device, wherein the first computing device utilizes an Advanced Vector Extensions 2 (AVX2), Streaming Single Instruction, Multiple Data (SIMD) Extensions (SSE), and/or Advanced SIMD (NEON) instruction set architecture.

17. One or more non-transitory computer-readable media that store instructions that, when executed by one or more processors of a participant computing device, cause the one or more processors to perform operations, the operations comprising:
  receiving an audio transmission comprising a transmitted audio signal for playback at an audio output device associated with the participant computing device, wherein the participant computing device is one of a plurality of participant computing devices of a participant cohort that are co-located within a same area;
  based on the transmitted audio signal, generating a plurality of matched filters that are each configured to predict at least a portion of an audio signal corresponding to audio caused by playback of the transmitted audio signal, wherein each of the plurality of matched filters comprises a plurality of coefficients;
  capturing audio data comprising a captured audio signal with an audio capture device associated with the participant computing device, wherein the captured audio signal corresponds to audio produced by playback of the transmitted audio signal with audio output devices of two or more participant computing devices of the participant cohort;
  identifying a matched filter of the plurality of matched filters that most accurately predicts the at least the portion of the audio signal;
  iteratively analyzing the one or more coefficients of the plurality of coefficients of the matched filter to select a coefficient from the plurality of coefficients that corresponds to a point at which the matched filter predicts the at least the portion of the audio signal;
  generating a delay estimate based on the coefficient; and
  performing, based at least in part on the delay estimate, an AEC process to remove the audio produced by the playback of the transmitted audio signal with the audio output devices of the two or more participant computing devices from the audio data.

18. The one or more non-transitory computer-readable media of claim 17, wherein iteratively analyzing the plurality of coefficients comprises:
  for one or more iterations:
    performing a smoothing process to a coefficient of the plurality of coefficients based on a weighting of a corresponding frame of a respective plurality of frames of the portion of the audio signal associated with the matched filter;
    determining a prediction metric indicative of a contribution by the coefficient to prediction of the at least the portion of the audio signal by the matched filter; and
    based on the prediction metric, determining whether to select the coefficient.

19. The one or more non-transitory computer-readable media of claim 18, wherein the prediction metric comprises a normalized error prediction energy.

20. The one or more non-transitory computer-readable media of claim 17, wherein capturing the audio data comprises capturing audio data comprising audio produced by an attempt at synchronized playback of an audio signal with the audio output devices of the two or more participant computing devices.

* * * * *